United States Patent
Ho et al.

(10) Patent No.: US 7,095,400 B2
(45) Date of Patent: Aug. 22, 2006

(54) METHOD OF AUTOMATICALLY ENABLING OR DISABLING BACKLIGHT OF ELECTRONIC DEVICE BASED ON A PREDETERMINED TIME

(75) Inventors: Tai Shui Ho, Taipei Hsien (TW); Shih Kuang Tsai, Taipei Hsien (TW); Xu Dong Chen, Shanghai (CN)

(73) Assignee: Inventec Appliances Corp., Taipei Hsien (TW)

( * ) Notice: Subject to any disclaimer, the term of this patent is extended or adjusted under 35 U.S.C. 154(b) by 427 days.

(21) Appl. No.: 10/627,809

(22) Filed: Jul. 28, 2003

(65) Prior Publication Data

US 2005/0024318 A1     Feb. 3, 2005

(51) Int. Cl.
*G09G 3/36* (2006.01)
(52) U.S. Cl. .................................. 345/102; 345/168
(58) Field of Classification Search .......... 345/102, 345/169, 156, 168, 172, 162, 170, 77, 87, 345/90; 455/127.4, 127.5, 343.1, 343.3, 455/550, 556, 566, 574; 315/158
See application file for complete search history.

(56) References Cited

U.S. PATENT DOCUMENTS

| | | | |
|---|---|---|---|
| 6,426,736 B1 * | 7/2002 | Ishihara ..................... 345/102 |
| 6,667,731 B1 * | 12/2003 | Park ........................... 345/102 |
| 6,731,958 B1 * | 5/2004 | Shirai ......................... 455/574 |
| 6,829,494 B1 * | 12/2004 | Tanabe ....................... 455/574 |
| 2004/0025175 A1 * | 2/2004 | Tamekuni et al. ............. 725/9 |
| 2004/0116167 A1 * | 6/2004 | Okuzako et al. ......... 455/575.3 |
| 2004/0225904 A1 * | 11/2004 | Perez et al. ................. 713/320 |
| 2004/0233153 A1 * | 11/2004 | Robinson .................... 345/102 |
| 2005/0140851 A1 * | 6/2005 | Shimizu ....................... 349/66 |

FOREIGN PATENT DOCUMENTS

WO    WO 002076068 A1 * 12/2000

* cited by examiner

*Primary Examiner*—Bipin Shalwala
*Assistant Examiner*—Nitin Patel
(74) *Attorney, Agent, or Firm*—Bacon & Thomas, PLLC

(57) ABSTRACT

The present invention is to provide a method of automatically enabling or disabling backlight of an electronic device based on a predetermined time, which is implemented in the electronic device including a memory having an established backlight control database containing a predetermined enabled and disabled time of backlight respectively. In response to a user pressing a key of the keypad as determined by the electronic device, the electronic device is able to automatically read and inquire the predetermined enabled or disabled time of backlight, and activate or deactivate the keypad backlight immediately when a predetermined condition (i.e., the predetermined enabled or disabled time of backlight) has been reached.

4 Claims, 3 Drawing Sheets

METHOD OF AUTOMATICALLY ENABLING OR DISABLING BACKLIGHT OF ELECTRONIC DEVICE BASED ON A PREDETERMINED TIME

FIELD OF THE INVENTION

The present invention relates to the field of enabling or disabling backlight of an electronic device and more particularly to a method of automatically enabling or disabling backlight of an electronic device (e.g., cellular phone) based on a predetermined time (e.g., 6 PM or 7 AM).

BACKGROUND OF THE INVENTION

High technology, particularly electronics technology has known a rapid, spectacular development in recent years. As such, a wide variety of new electronic products are available in a fast pace. A unique one of the new electronic products is cellular phone having advantages of compactness, multi-function, and easy operation. Cellular phones also have characteristics of being lightweight, slim, and advanced. Thus, it is obvious that cellular phone is the most important one of the wide variety of new electronic products.

Conventionally, backlight device is only provided in a keypad of a cellular phone. The backlight device is adapted to enable or disable in a simple way. For example, a user can press any key of the keypad to enable the backlight device irrespective of day or night. Light is thus emitted from the enabled backlight device.

The above technique can solve the problem of being unable to see keys of cellular phone clearly in the night or dark environment by emitting light by activating the backlight device. However, control of the backlight device in the keypad is disadvantageous because it is done by manually enabling or disabling the setting. As such, many users frequently experienced tediousness and inconvenience in setting the activation or deactivation time of the backlight device. As a result, it is frequent that the backlight device of a cellular phone is always in an enabled state irrespective of day or night.

However, electric energy of battery of a cellular phone is consumed significantly because the backlight device is in an operating state for a long period of time even in a bright daytime and also the cellular phone is frequently used. As a result, both standby time and operating time of the cellular phone are shortened greatly.

Thus, it is desirable to provide a method of automatically enabling or disabling backlight of a cellular phone based on a predetermined time in order to overcome the above drawbacks of the prior art.

SUMMARY OF THE INVENTION

A primary object of the present invention is to provide a method of automatically enabling or disabling backlight of an electronic device based on a predetermined time. The method is implemented in the electronic device including a memory having an established backlight control database containing a predetermined enabled time of backlight and a predetermined disabled time of backlight. Thus, in response to user pressing a key of the keypad as determined by the electronic device, the electronic device is able to automatically read and inquire the predetermined enabled time of backlight and the predetermined disabled time of backlight and activate or deactivate the keypad backlight immediately when a predetermined condition (i.e., the predetermined enabled time of backlight or the predetermined disabled time of backlight) has been reached. As a result, unnecessary activation time of backlight and electric energy of battery of the electronic device can be reduced significantly, standby time and operating time of the electronic device are increased greatly, and the goal of complying with environmental protection can be obtained. By utilizing the present invention, the above drawbacks of the prior art can be overcome. These drawbacks are that control of the backlight device in the keypad often causes a user to experience tediousness and inconvenience in setting the activation or deactivation time of the backlight device. Also, it is frequent that the backlight device of the prior cellular phone is in an enabled state for a long period of time even in a bright daytime. This together with a frequent use of the cellular phone can cause electric energy of battery of the cellular phone to consume significantly, resulting in a great shortening of both standby time and operating time of the cellular phone.

The above and other objects, features and advantages of the present invention will become apparent from the following detailed description taken with the accompanying drawings.

DETAILED DESCRIPTION OF THE PREFERRED EMBODIMENTS

It is understood that more and more people like to use cellular phones as portable communication devices due to its simple operation and other benefits. However, many users frequently experienced tediousness and inconvenience in setting the activation or deactivation time of the backlight device of a prior cellular phone. As an end, it is frequent that the backlight device is always in an enabled state irrespective of day or night. This, inevitably, will consume electric energy of battery of the cellular phone significantly, resulting in a great shortening of standby time and operating time of the cellular phone.

Figure 1:
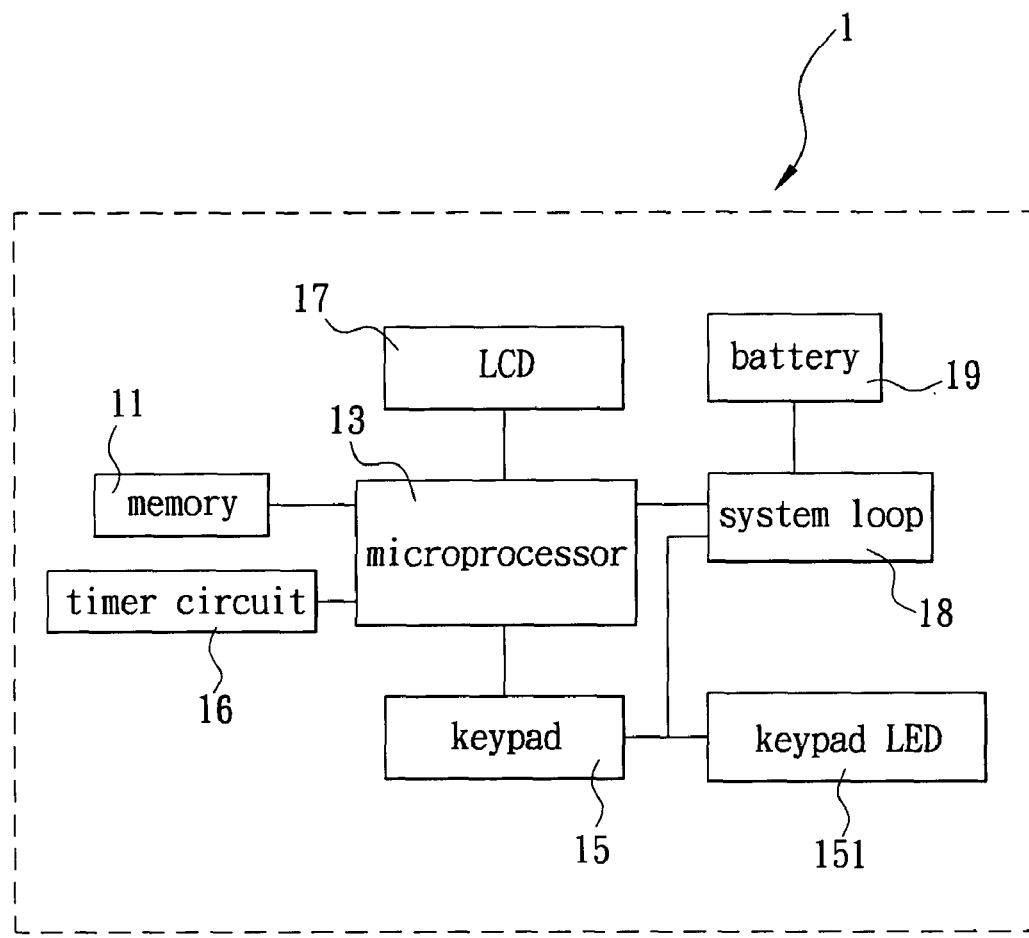
FIG. 1 is a block diagram of an electronic device according to the invention.

The invention is directed to a method of automatically enabling or disabling backlight of an electronic device based on a predetermined time for solving the prior problems. Referring to FIG. 1, the method is implemented by establishing a backlight control database in a memory 11 of an electronic device (e.g., cellular phone in the invention) 1. The database comprises a number of backlight conditions set in the memory 11. These backlight conditions are about enabled time and disabled time of backlight of the electronic device 1. As such, a microprocessor 13 of the electronic device 1 is able to automatically read and inquire the predetermined enabled time and disabled time of backlight in response to pressing one key of a keypad 15 by a user. Also, the backlight of the electronic device 1 can be automatically enabled or disabled in response to determining that the predetermined enabled time or disabled time of backlight has been reached. In such a manner, the backlight of the electronic device 1 can be enabled or disabled automatically when the reached predetermined condition has been reached in response to user input. As a result, unnecessary activation time of backlight and electric energy of a battery 19 of the electronic device 1 can be reduced significantly, standby time and operating time of the electronic device 1 are increased greatly, and the goal of complying with environmental protection can be obtained.

Referring to FIG. 1, in the invention the microprocessor 13 comprises a timer circuit 16 for performing time count. The microprocessor 13 is coupled to an LCD (liquid crystal display) 17, a system loop 18, a keypad 15, and the memory 11 respectively. The keypad 15 comprises a keypad LED (light emitting diode) 151 for emitting backlight. Hence, a user can clearly see alphabets or characters printed on the keypad 15 even in a dark environment when the keypad 15 is lit by light emitted from the keypad LED 151. The keypad LED 151 is coupled to the system loop 18 which is in turn coupled to the battery 19. Note that the battery 19 is rechargeable in the embodiment. While it is appreciated by those skilled in the art that the battery 19 may not be rechargeable in any of other embodiments without departing from the scope and spirit of the invention. The battery 19 is capable of supplying required power to the system loop 18, the LCD 17, the timer circuit 16, the keypad 15, the microprocessor 13, the memory 11, and the keypad LED 151 respectively. As such, the microprocessor 13 is able to perform associated processing in response to input signals of the keypad 15.

Figure 2:
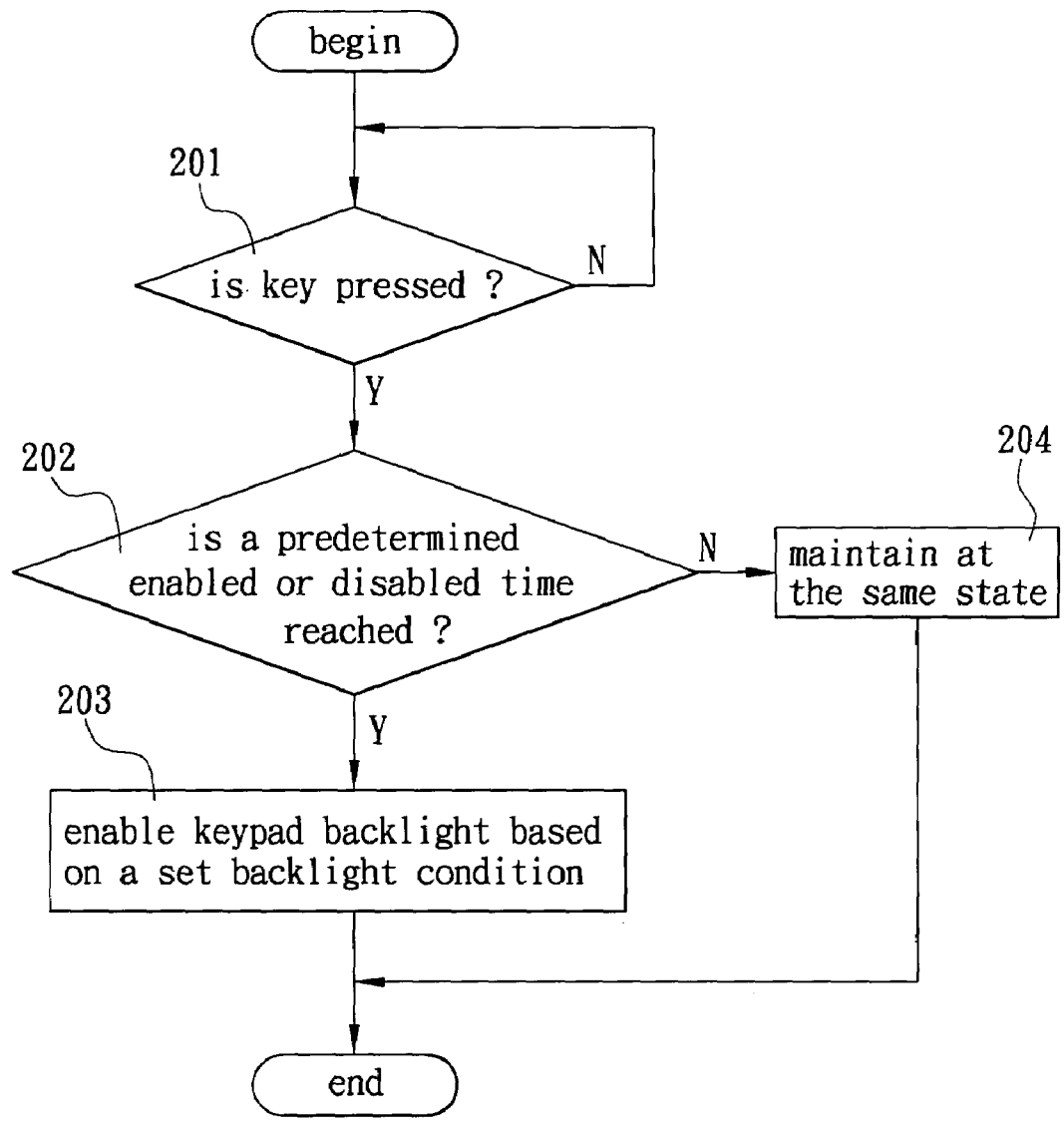
FIG. 2 is a flow chart showing a sequence of method steps performed by the electronic device of FIG. 1 for automatically controlling the activation of keypad backlight.

Referring to FIG. 2 in conjunction with FIG. 1, in the invention in response to establishing a backlight control database in the memory 11 by a user by operating keypad 15 of the electronic device 1 and using the electronic device 1 thereafter, causing the microprocessor 13 of the electronic device 1 to perform the following steps of a process:

In step 201, first determine whether a key of the keypad 15 is pressed by a user. If yes, the process goes to step 202. Otherwise, the process loops back to itself for continuation.

In step 202, in response to determining that the user has pressed a key of the keypad 15, automatically read and inquire the predetermined enabled time and disabled time of backlight from the backlight control database in the memory 11 and then determine whether the predetermined enabled time or disabled time of backlight has been reached. If yes, the process goes to step 203. Otherwise, the process jumps to step 204.

In step 203, activate the keypad LED 151 to enable or disable keypad backlight of the electronic device 1 based on the predetermined enabled time or disabled time of backlight stored in the database. The process ends normally.

In step 204, maintain the electronic device 1 at its current state.

Hence, any selected enabled time or disabled time of backlight is invalid when the backlight condition is set at a disabled state. To the contrary, the electronic device 1 will enable or disable backlight precisely based on the predetermined enabled time or disabled time of backlight when the backlight condition is set at an enabled state.

The above process is described in a preferred embodiment as follows: For example, the backlight conditions in the database of the electronic device 1 are that keypad backlight will be enabled at 6 PM and will be disabled at 7 AM respectively. The backlight condition is then stored in memory 11. At the same time, the timer circuit 16 is activated to begin time count.

Next, in response to determining that a user has pressed a key of the keypad 15, automatically read and inquire the predetermined enabled time and disabled time of backlight and then determine whether the predetermined enabled time or disabled time of backlight has been reached.

In a case that a user operates the cellular phone by pressing any key of the keypad 15 at 6 PM (i.e., the predetermined enabled time of backlight has been reached), the electronic device 1 will automatically read the predetermined enabled time of backlight and activate the keypad LED 151 based on the read enabled time of backlight. As a result, the keypad backlight is enabled (i.e., light turned on).

In another case that the electronic device 1 will maintain its current state without activating the keypad LED 151 when time has not reached 6 PM (i.e., the predetermined enabled time of backlight has not been reached).

In still another case that a user presses any key of the keypad 15 at 7 AM (i.e., the predetermined disabled time of backlight has been reached), the electronic device 1 will automatically read the predetermined disabled time of backlight and deactivate the keypad LED 151 based on the read disabled time of backlight. As a result, the keypad backlight is disabled (i.e., light turned off).

In such a manner, unnecessary activation time of backlight and electric energy of the battery 19 of the electronic device 1 can be reduced significantly, and standby time and operating time of the cellular phone are increased greatly.

Figure 3:
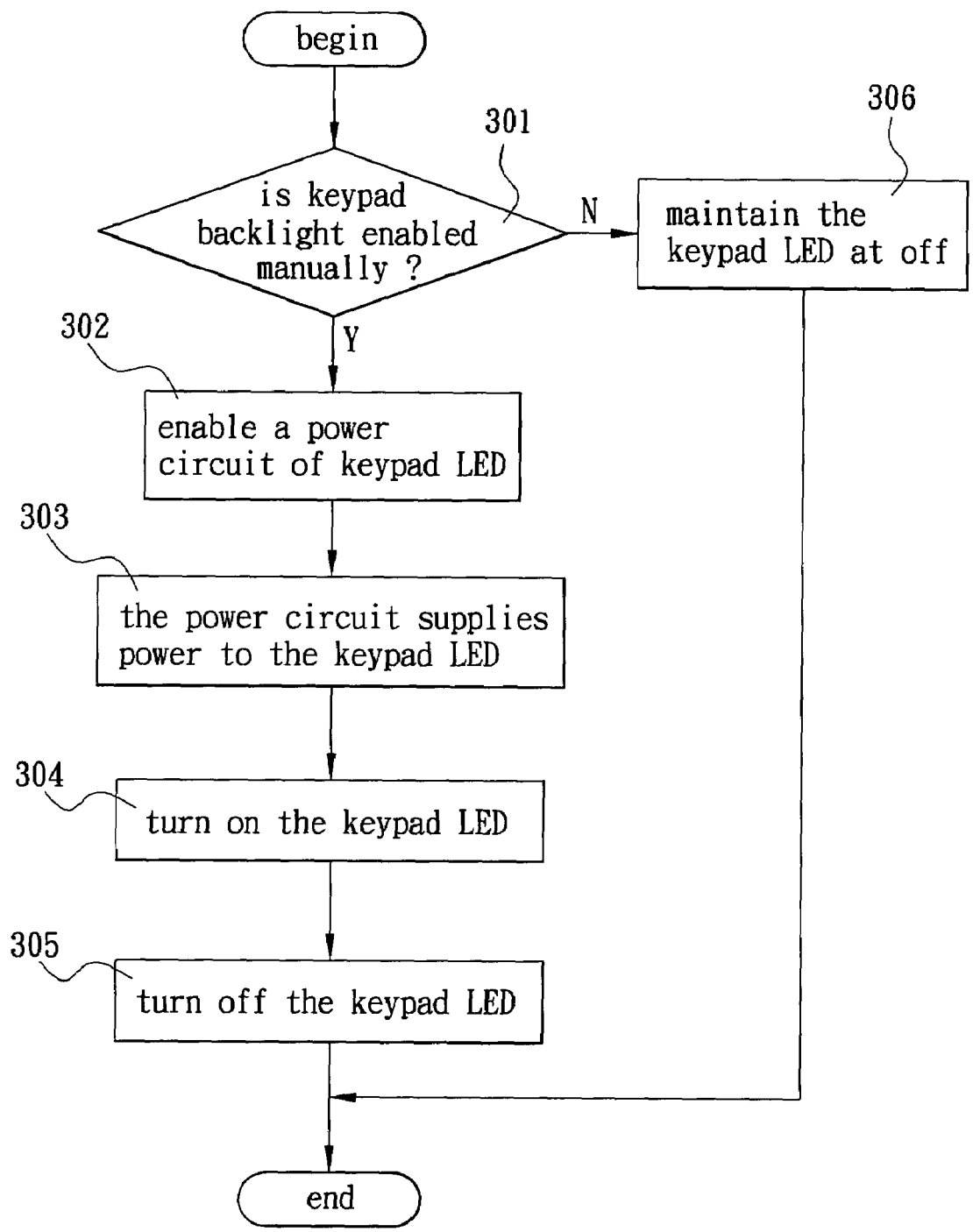
FIG. 3 is a flow chart showing a sequence of method steps performed by the electronic device of FIG. 1 for manually controlling the activation of keypad backlight.

Referring to FIG. 3, in the invention a key (e.g., MENU key or OPTION key) of the keypad 15 is set as a default backlight activation key in the database. In response to pressing the default backlight activation key by a user when the backlight condition is set as a disabled state, the keypad backlight can be lit manually (i.e., the keypad LED 151 is enabled) by causing the microprocessor 13 to perform the following steps of a process:

In step 301, first determine whether the default backlight activation key is pressed by a user. If yes, the process goes to step 302. Otherwise, the process jumps to step 306.

In step 302, in response to determining that the user has pressed the default backlight activation key, activate a power circuit of the keypad LED 151.

In step 303, the power circuit supplies power to the keypad LED 151.

In step 304, light is emitted from the keypad LED 151 as energized by power supplied from the power circuit prior to enabling the keypad backlight and causing the timer circuit 16 to begin time count.

In step 305, the power circuit is disabled (i.e., stop supplying power) when the time count of the timer circuit 16 has reached a predetermined period of time (e.g., 30 seconds). As a result, the keypad LED 151 is disabled and thus light is turned off. The process then ends normally.

In step 306, maintain the keypad LED 151 at its current state (i.e., disabled state) in response to pressing any of other keys. The process then ends normally.

In brief, enabled time or disabled time of the backlight of the electronic device 1 can be set in the backlight activation or deactivation condition in the database. In response to user pressing a key of the keypad 15 as determined by the electronic device 1, the electronic device 1 is able to automatically read and inquire the predetermined enabled time and disabled time of backlight and activate or deactivate the keypad backlight immediately when the predetermined condition (i.e., the predetermined enabled time or disabled time of backlight) has been reached. As a result, unnecessary activation time of backlight and electric energy of the battery 19 of the electronic device 1 can be reduced significantly, and standby time and operating time of the electronic device 1 are increased greatly.

While the invention has been described by means of specific embodiments, numerous modifications and variations could be made thereto by those skilled in the art without departing from the scope and spirit of the invention set forth in the claims.

What is claimed is:

1. A method of automatically and manually enabling or disabling a backlight of an electronic device based on a predetermined time, the method being implemented in the electronic device including a memory having an established backlight control database containing a predetermined enabled time of the backlight and a predetermined disabled time of the backlight, one of the keys of a keypad of the electronic device being set as a default backlight activation key in the database, and a microprocessor which, in response one key being pressed, performs the steps of:

for automatically enabling and disabling the backlight:

reading the predetermined enabled time of the backlight and the predetermined disabled time of the backlight from the database of the memory, and determining whether the predetermined enabled time of backlight or the predetermined disabled time of backlight has been reached;

in response to having reached the predetermined enabled time of backlight or the predetermined disabled time of backlight, activating a keypad LED of the electronic device to enable or disable a keypad backlight of the electronic device;

for manually enabling and disabling the backlight when the default backlight activation key is pressed and a backlight condition of the electronic device is in a disabled state:

determining whether the default backlight activation key is pressed;

in response to the default backlight activation key being pressed, activating a power circuit to supply power to the keypad LED and cause the keypad LED to emit light;

enabling a timer circuit to begin a time count; and disabling the power circuit to supply power to the keypad LED when the time count of the timer circuit has reached a predetermined period of time, disabling the keypad LED and thereby turning off the keypad backlight.

2. The method of claim 1, wherein the keypad LED is maintained at the disabled state in response to pressing any key other than the default backlight activation key.

3. The method of claim 1, wherein the default backlight activation key is a MENU key.

4. The method of claim 1, wherein the default backlight activation key is an OPTION key.

* * * * *